US012260193B2

(12) United States Patent
Kunz

(10) Patent No.: US 12,260,193 B2
(45) Date of Patent: Mar. 25, 2025

(54) COMPOSABLE PROCESSING FRAMEWORK BASED ON WEB ASSEMBLY COMPONENT MODEL

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 18/179,850

(22) Filed: Mar. 7, 2023

(65) Prior Publication Data

US 2024/0303050 A1 Sep. 12, 2024

(51) Int. Cl.
*G06F 8/41* (2018.01)
*G06F 8/30* (2018.01)

(52) U.S. Cl.
CPC . *G06F 8/41* (2013.01); *G06F 8/31* (2013.01)

(58) Field of Classification Search
CPC ................................... G06F 8/41; G06F 8/31
USPC ................................................ 717/120–178
See application file for complete search history.

(56) References Cited

U.S. PATENT DOCUMENTS

| 6,637,020 | B1 * | 10/2003 | Hammond | G06F 8/34 |
| | | | | 717/107 |
| 6,804,686 | B1 * | 10/2004 | Stone | G06F 8/10 |
| 2001/0025373 | A1 * | 9/2001 | Gebhart | G06F 8/31 |
| | | | | 717/146 |
| 2001/0056504 | A1 * | 12/2001 | Kuznetsov | G06F 40/154 |
| | | | | 719/310 |
| 2003/0070006 | A1 * | 4/2003 | Nadler | G06F 9/548 |
| | | | | 719/330 |
| 2007/0038666 | A1 * | 2/2007 | Meijer | G06F 16/25 |
| 2018/0165175 | A1 * | 6/2018 | Guan | G06F 11/362 |

OTHER PUBLICATIONS

Phipps, Geoffrey, Marcia A. Derr, and Kenneth A. Ross. "Glue-Nail: A deductive database system." Proceedings of the 1991 ACM SIGMOD international conference on Management of data. 1991. pp. 308-317. (Year: 1991).*
Kim, Miryung, et al. "An ethnographic study of copy and paste programming practices in OOPL." Proceedings. 2004 International Symposium on Empirical Software Engineering, 2004. ISESE'04.. IEEE, 2004.pp. 83-92. (Year: 2004).*
Matthews, Jacob, and Robert Bruce Findler. "Operational semantics for multi-language programs." ACM SIGPLAN Notices 42.1 (2007): pp. 3-10. (Year: 2007).*
Ousterhout, John K. "Scripting: Higher level programming for the 21st century." Computer 31.3 (1998): pp. 23-30. (Year: 1998).*
Kochhar, Pavneet Singh, Dinusha Wijedasa, and David Lo. "A large scale study of multiple programming languages and code quality." 2016 IEEE 23rd international conference on software analysis, evolution, and reengineering (SANER). vol. 1. IEEE, 2016. pp. 563-573 (Year: 2016).*

(Continued)

*Primary Examiner* — Satish Rampuria
(74) *Attorney, Agent, or Firm* — SCHWEGMAN LUNDBERG & WOESSNER, P.A.

(57) ABSTRACT

In an example embodiment, a common, composable abstraction is provided that allows components to work efficiently across programming languages and services without the need to write glue code. Application developers can concentrate on the application logic itself. The functionality of services can be developed by framework developers only once, using the programming language of their choice.

20 Claims, 5 Drawing Sheets

(56) References Cited

OTHER PUBLICATIONS

"European Application Serial No. 23182631.4, Extended European Search Report mailed Jan. 4, 2024", 10 pgs.

Bruyat, Julian, et al., "WasmTree: Web Assembly for he Semantic Web", Topics in Cryptology—CT-RSA: The Cryptographers' Track at the RSA Conference, (2021), 582-597.

Kjorveziroski, Vojdan, et al., "Evaluating WebAssembly for Orchestrated Deployment of Serverless Functions", 30th Telecommunication Forum, IEEE, (Nov. 15, 2022), 1-4.

* cited by examiner

COMPOSABLE PROCESSING FRAMEWORK BASED ON WEB ASSEMBLY COMPONENT MODEL

TECHNICAL FIELD

This document generally relates to computer software application development. More specifically, this document relates to use of a composable processing framework based on a web assembly component model.

BACKGROUND

Modernly, software application code is often highly fragmented, including a combination of one or more programming languages, outbound services (e.g., databases, message brokers, etc.), and inbound services (such as HyperText Transfer Protocol (HTTP) services (including protocols such as GraphQL and OData), and message brokers). The result is that application developers need to create a lot of what is called "glue code". Glue code refers to the code that connects separate software components or systems together, in order to coordinate their interaction and facilitate communication. It acts as a "glue" that holds the components together and enables them to work as a single integrated system. Glue code is typically used to integrate different APIs, data formats, and protocols, and is often written in a low-level programming language such as C or C++. It is usually minimal, simple, and focused on facilitating the integration of the components, rather than providing any significant functionality of its own.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
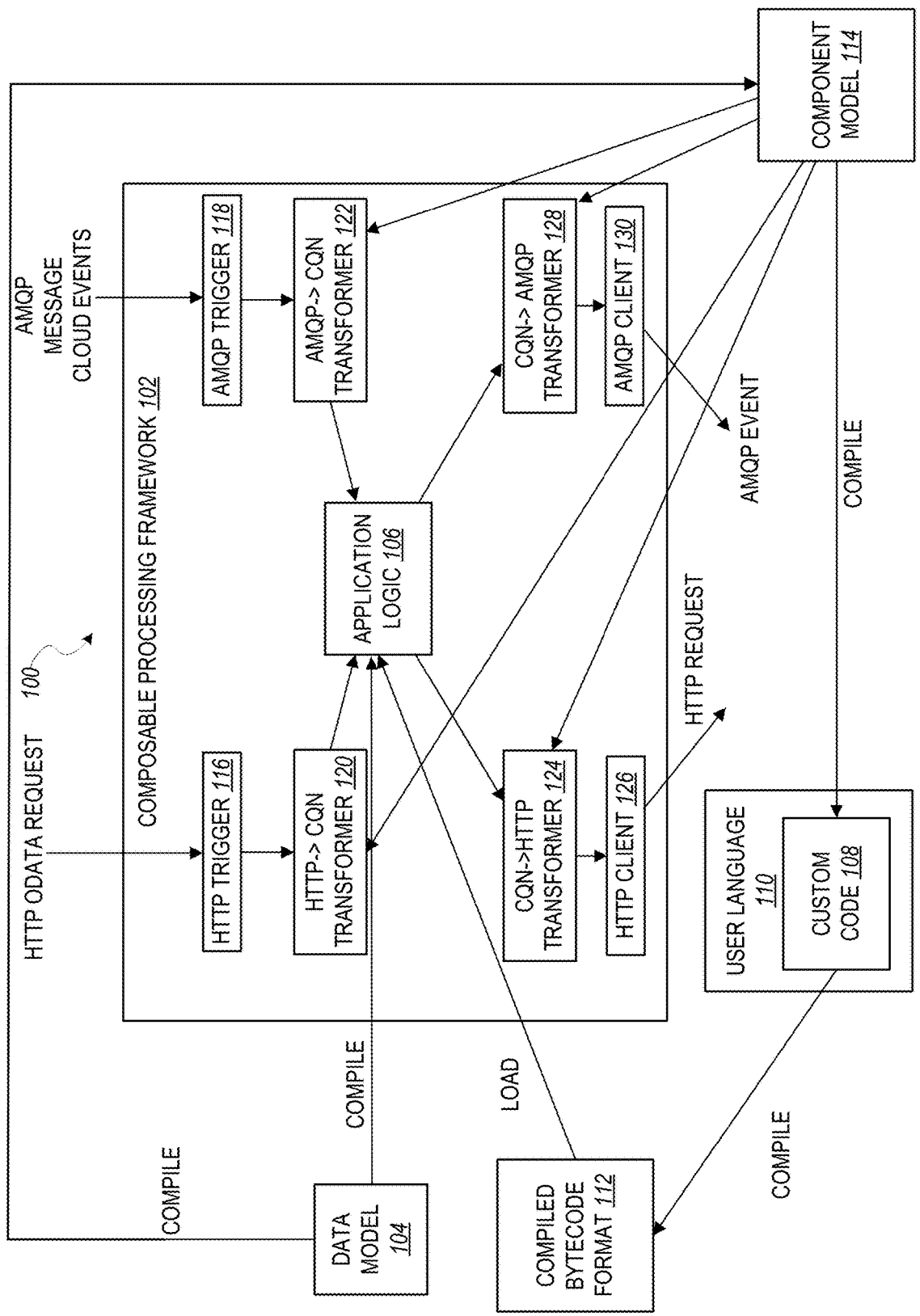
FIG. 1 is a block diagram illustrating a system including a composable processing framework in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Writing a lot of glue code can be time-consuming for application developers, not just in the development stage but also in later stages. If reuse code is not written in a host's programming language, for example, it needs to be rewritten, even though the code itself is being reused. If a service client (inbound or outbound) is not available for a host's programming language, then the service client needs to be built. Furthermore, changing services also then requires changes to the code.

In an example embodiment, a common, composable abstraction is provided that allows components to work efficiently across programming languages and services without the need to write glue code. Application developers can concentrate on the application logic itself. The functionality of services can be developed by framework developers only once, using the programming language of their choice.

More particularly, a composable processing framework provides a generic server, which is able to process operations defined by a data model created by an application developer. The composable processing framework may utilize a language-agnostic notation, such as Core Query Notation. Core Query Notation is a syntax used to represent queries in a structured and standardized manner. It can be used in database management systems and search engines to allow users to search and retrieve specific information from a large data set in an organized and efficient manner. The syntax typically includes elements such as keywords, operators, and logical statements that are combined to form a query, which can then be executed to retrieve relevant information from the data set. Essentially, however, it can be used as an abstract way to encode intent in term of queries (e.g., SELECT, CREATE, etc.).

While many aspects of a service can be defined by using the data model itself, in many instances the data model alone is not enough to create a full service. For that, some level of custom code is needed from the application developer. It can be difficult, however, for the application developer to create that custom code when they are restricted to doing so by just using the programming language utilized by the generic server (called the host language, oftentimes Java). Thus, in an example embodiment, the composable processing framework allows the application developer to create the custom code in a programming language of their choice, as long as that programming language is compilable to a bytecode format, such as WebAssembly. The custom code is compiled into that byte-code format, and then loaded into the composable processing framework, where it can be interacted with via Core Query Notation commands.

WebAssembly (WASM) is a low-level binary instruction format for a stack-based virtual machine that is designed to be run in web browsers. In an example embodiment, a WebAssembly runtime is used to execute WebAssembly modules on a server, and allows these modules to be composed with interfaces based on a WebAssembly component model.

These interfaces may be written in WIT (WebAssembly Interface).

WIT is a WASM specification that defines a set of rules and conventions for describing the interfaces between WASM modules and host environments, allowing them to communicate and interoperate.

In more technical terms, WIT is a set of types and functions that define the way in which data is passed between WebAssembly modules and the host environment, as well as how functions are invoked and results are returned. This specification provides a way for WASM modules to declare the types of their functions and the types of data they expect and return, which enables safe and efficient communication between the module and the host environment.

More particularly, WIT Bindgen may be used. WIT Bindgen is a tool that generates host bindings for WebAssembly modules based on their interface descriptions using the WIT specification. Essentially, WIT Bindgen takes a WebAssembly module that has been annotated with WIT type information, and generates host language bindings that can be used to call the module's functions and access its data.

WIT Bindgen is part of the Rust programming language's WebAssembly tooling ecosystem. It is designed to work with the WASM-Bindgen tool, which provides a similar capability for generating JavaScript bindings for WebAssembly modules.

One of the key benefits of WIT Bindgen is that it automates the process of generating host language bindings, which can be a time-consuming and error-prone process when done manually. By using WIT Bindgen, developers can avoid the need to write and maintain custom host bindings for their WebAssembly modules, and instead focus on writing the module's logic in the target language.

The WebAssembly component model is a portable load- and run-time efficient binary format that allows web applications to be constructed from reusable components written in WASM, which are then assembled into a larger whole to form the final application. This approach allows developers to take advantage of the benefits of WASM, such as performance and security, while also providing a modular and maintainable structure for their applications. The component model enables developers to write reusable code in WASM that can be shared across multiple applications, reducing the amount of duplication and improving the overall quality of the code. Additionally, the component model can improve the overall performance of the application by allowing developers to write high-performance components in WASM, while using JavaScript for the parts of the application that benefit from its dynamic and expressive nature.

FIG. 1 is a block diagram illustrating a system 100 including a composable processing framework 102 in accordance with an example embodiment. An application developer creates a data model 104, which can then be compiled into an application logic 106 in the composable processing framework 102. In an example embodiment, the data model 104 may be created in a data and services object, such as a Core Data and Services (CDS) model. CDS models are plain JavaScript objects complying with the Core Schema Notation. CDS models are written in the CDS data modeling language. CDS enables the central definition of business entities and their relationships, as well as the definition of services that operate on those entities. This allows developers to build applications that can share and reuse business data and logic, reducing the duplication of effort and increasing the consistency and accuracy of data across the enterprise.

In some example embodiments, a CDS component (not pictured) may be provided, that comprises a common set of domain-specific languages (DSL) and services. The CDS component may allow defining and consuming semantically rich data models as an integral part of a database structure, thereby permitting data modeling as well as the retrieval and processing of data to be raised to a higher semantic level that is closer to the conceptual thinking of domain experts.

In particular, the CDS component implements higher-level Domain Specific Languages (DSLs) and services based on an entity-relationship model (ERM). A Data Definition Language (DDL) is used for defining semantically rich data models, including the data types, associated metadata, and database organization (e.g., columns and tables). A Query Language (QL) is used to conveniently and efficiently read data based on data models. It is also used to define views within data models. An Expression Language (EL) is used to specify calculated fields, default values, constraints, etc., within queries. Calculated fields, default values, and constraints may be specified as well as for elements in data models.

As described above, while the data model 104 itself can be used to create a service in application logic 106, it cannot be used to create all the functionality of many services. For that, some level of custom code is needed. As such, in an example embodiment, the application developer also creates custom code 108 in a user language 110. The user language 110 may be any language that is able to be compiled into a compiled bytecode format 112, such as WebAssembly. Other examples of compiled bytecode formats include Java bytecode, Python bytecode, .NET bytecode, and Lua bytecode.

Optionally, a component model 114 may also be used to generate one or more interfaces. These interfaces may be utilized by the application developer when creating the custom code 108, but can also be used directly by the composable processing format, either in their original form or in a reverse form.

More particularly, the component model may produce one or more interfaces that can be used to translate between Core Query Notation and other formats utilized by services or entities interacting with the composable processing framework 102.

The developer of the composable processing framework 102 may create one or more triggers, such as an HTTP trigger 116 and/or an Advanced Message Queuing protocol (AMQP) trigger 118. AMQP is an open standard application layer protocol for message-oriented middleware. It provides a way for applications to communicate with each other in a reliable and asynchronous manner by exchanging messages through a message broker. AMQP is designed to support a wide range of messaging use cases, including queuing, publish/subscribe, and request/reply, and it has become a popular choice for integrating systems in financial, healthcare, and logistics industries. AMQP defines a standard wire-level protocol for message-oriented middleware, which includes a set of rules for encoding and decoding messages, as well as a specification for the behavior of the message broker. This makes it possible for different implementations of AMQP to interoperate, allowing applications written in different programming languages to communicate with each other.

The triggers 116 and 118 listen for corresponding messages to be received, at which point an action is triggered. For example, the HTTP trigger 116 listens for HTTP commands, such as an HTTP ODATA request, to be received, while the AMQP trigger 118 listens for AMQP messages, such as AMQP message cloud events, to be received. The triggers may prompt a corresponding transformer (here HTTP-CQN transformer 120 or AMQP→CQN transformer 122) to translate the corresponding command or message into CON format to be used by the application logic.

Notably, since the component model 114 may have defined interfaces in the reverse direction (e.g., CON→HTTP and/or CON→AMQN), then the composable processing framework may essentially reverse the interfaces defined by the component model 114 to create HTTP-CQN transformer 120 and AMQP→CQN transformer 122.

Similar interfaces can be used on the output side of the application logic 106 to transform the CQN output into the desired protocol. Here, for example, CON→HTTP transformer 124 may transform CQN output to HTTP format for use by the defined HTTP client 126 or similar endpoint defined on the composable processing framework 102. Likewise, CON→AMQP transformer 128 may transform CQN output to AMQP format for use by the defined AMQP client 130 or similar endpoint defined on the composable processing framework 102.

In an example embodiment, the component model 114 may utilize the WebAssembly component model.

The WebAssembly component model is a way of organizing and structuring applications that are built using WebAssembly (WASM). It provides a modular and composable approach to building web applications, allowing developers to break down their applications into smaller, reusable components that can be combined to build a complete application.

In the WebAssembly component model, each component is packaged as a WASM module and is designed to expose a set of well-defined APIs. These modules can then be imported and used by other modules, allowing developers to build applications by composing smaller, reusable components.

One of the key benefits of the WebAssembly component model is that it allows developers to write code in a variety of programming languages, including C, C++, Rust, and others, and then compile it to WASM. This makes it possible to leverage existing codebases and libraries, and to take advantage of the strengths of different programming languages.

In addition, the Web Assembly component model provides a way to isolate components from one another, helping to ensure that failures in one component do not affect the overall stability of the application. This, in turn, makes it easier to build and maintain large, complex applications.

Overall, the WebAssembly component model provides a flexible and scalable approach to building web applications, allowing developers to build applications from smaller, reusable components, and to use a variety of programming languages to do so.

The compiled bytecode format 112 of the custom code 108 can then be loaded into the composable processing framework 102 as part of the application logic 106.

In another example embodiment the speed and isolation capabilities of the WebAssembly (or similar) component model is leveraged to allow the application developers to create multi-tenant applications. The isolation prevents one tenant from reading data, destroying code, or reading from the file systems of other tenants.

It should also be noted that with recent developments in enabling WASM to be executed outside the browser (enabling WASM to make system calls), support for a variety of languages to be compiled in WASM may make it suitable to be executed in a serverless fashion.

Figure 2:
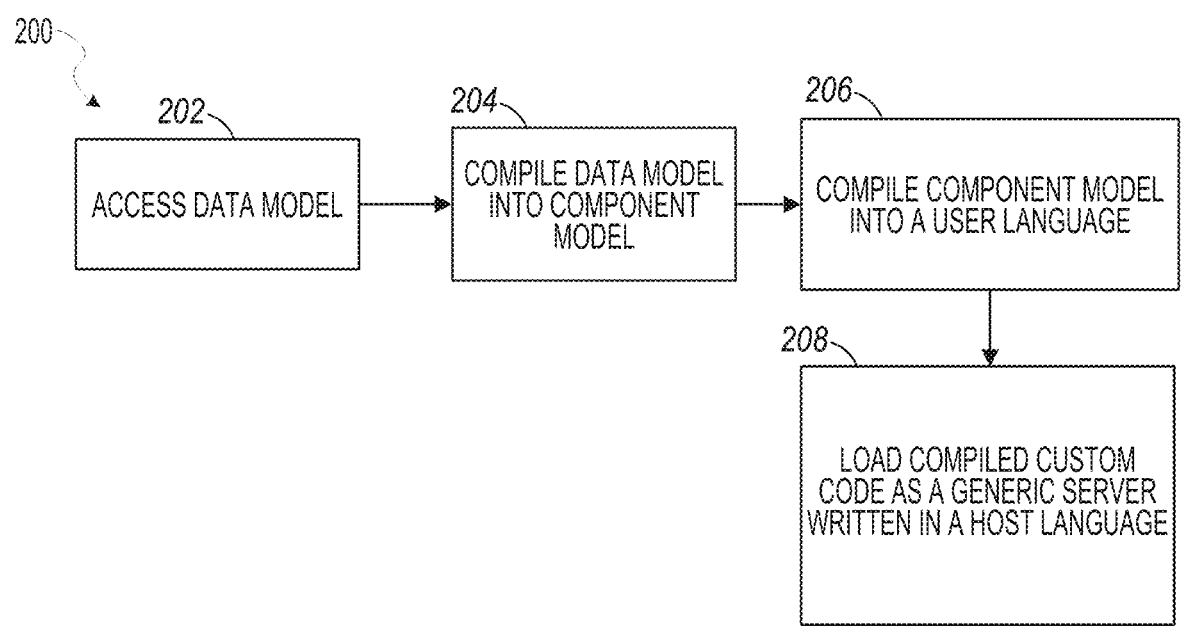
FIG. 2 is a flow diagram illustrating a method of creating custom code in a software environment, in accordance with an example embodiment.

FIG. 2 is a flow diagram illustrating a method 200 of creating custom code in a software environment, in accordance with an example embodiment. The operations in FIG. 2 may be performed by a composable processing framework, such as composable processing framework 102 of FIG. 1.

At operation 202, a data model is accessed. The data model may have been created using, for example, CDS, by an application developer. At operation 204, the data model is compiled into a component model. The component model may be, for example, a WebAssembly component model.

At operation 206, the component model is compiled into a user language. The user language is any language of choice for the application designer, as long as that user language can be compiled into a bytecode format, such as WebAssembly. One example of a user language is Rust.

While not pictured in this flow diagram because the operations in the flow diagram are performed by the composable processing framework, at this point the application developer creates custom code in the user language using the compiled component model. The application developer then compiles this custom code into a bytecode format, such as WebAssembly.

At operation 208, the composable processing framework loads the compiled custom code (which was compiled in bytecode format) as a generic server written in a host language, which is able to process operations defined by the data model. The host language is any language of choice for the framework developer. One example of a host language is Core Query Notation.

Figure 3:
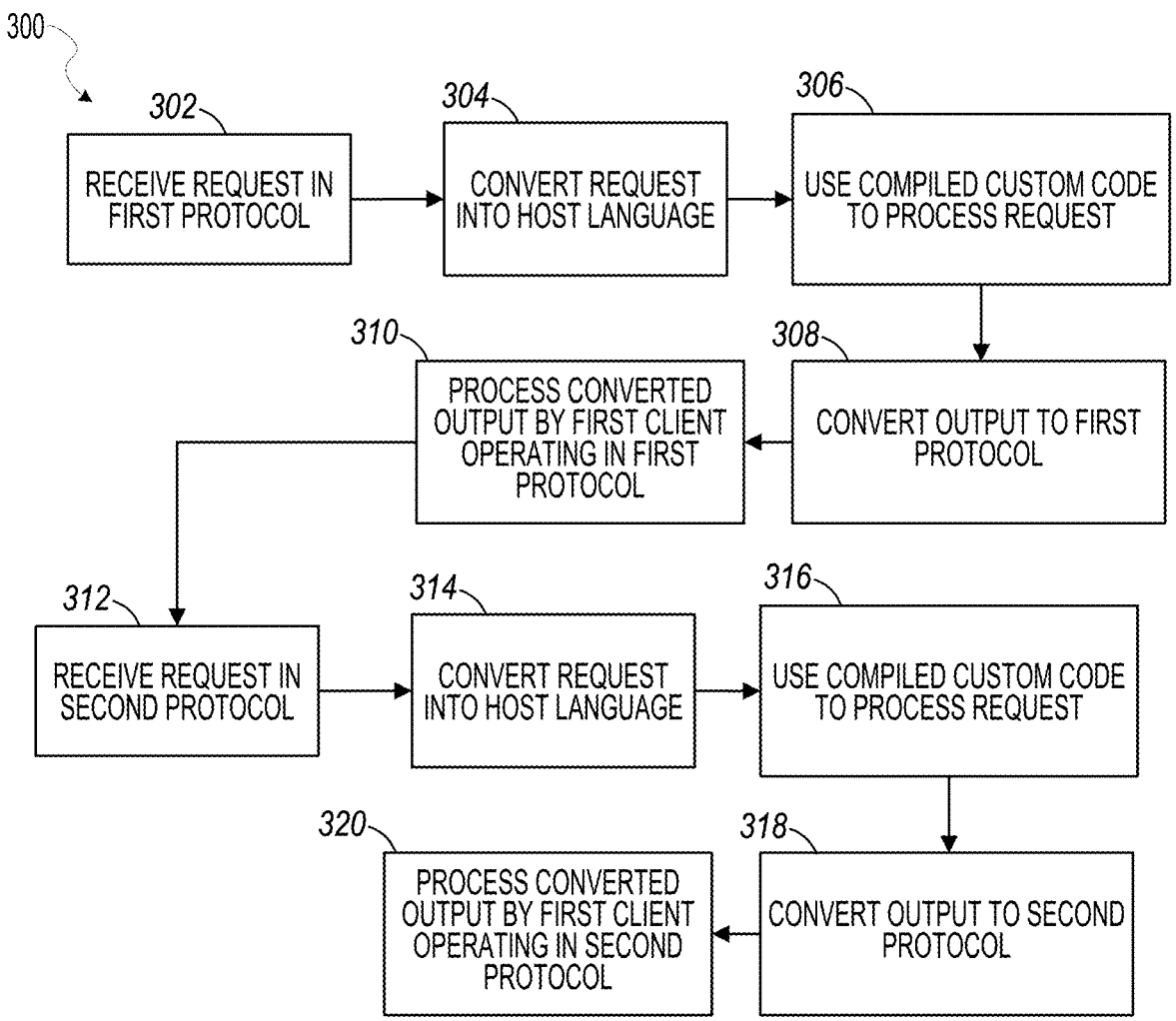
FIG. 3 is a diagram illustrating a method of using custom code in a software environment, in accordance with an example embodiment.

At this stage, the application logic (such as application logic 106 of FIG. 1) has been set up and is ready for execution. This execution may include the receiving of requests and the generation of requests or events based on the received requests. FIG. 3 is a diagram illustrating a method 300 of using custom code in a software environment, in accordance with an example embodiment. At operation 302, a request in a first protocol is received. At operation 304, the request in the first protocol is converted to a host language using a first transformer. This first transformer is specifically designed to convert requests in the first protocol to the host language. In an example embodiment, the first protocol is HTTP and the host language is Core Query Notation.

At operation 306, the compiled custom code, which was loaded into the composable processing framework in operation 208 of FIG. 2, processes the request that has been converted into the host language using the first transformer. The output from this is some sort of action, such as a database or other data request. At operation 308, this output is converted to the first protocol using a second transformer. The second transformer is specifically designed to convert the host language to the first protocol. At operation 310, the converted output is processed by a first client operating on messages in the first protocol.

At operation 312, a request in a second protocol is received. At operation 314, the request in the second protocol is converted to a host language using a third transformer. This third transformer is specifically designed to convert requests in the second protocol to the host language. In an example embodiment, the second protocol is AMQP.

At operation 316, the compiled custom code processes the request that has been converted into the host language using the third transformer. The output from this is some sort of action, such as a database or other data request. At operation 318, this output is converted to the second protocol using a fourth transformer. The fourth transformer is specifically designed to convert the host language to the second protocol. At operation 320, the converted output is processed by a second client operating on messages in the second protocol.

In view of the disclosure above, various examples are set forth below. It should be noted that one or more features of an example, taken in isolation or combination, should be considered within the disclosure of this application.

Example 1. A system comprising:
    at least one hardware processor; and
    a computer-readable medium storing instructions that,
        when executed by the at least one hardware processor, cause the at least one hardware processor to perform operations comprising:
accessing a data model;
compiling the data model into a component model;
compiling the component model into a user programming language, the user programming language being a programming language compilable into a bytecode format;
accessing custom code, written in the user language, the custom code including the compiled component model;
compiling the custom code into the bytecode format;
loading the compiled custom code into a framework running a host programming language; and
executing the compiled custom code to create a server process.

Example 2. The system of Example 1, wherein the server process further contains at least one interface, based on the component model, that translates input to the custom code from a first format into the host programming language, and at least one interface, based on the component model, that translates output from the custom code from the host programming language into the first format.

Example 3. The system of Example 2, wherein the first format is Hypertext Transfer Protocol (HTTP).

Example 4. The system of any of Examples 1-3, wherein the bytecode format is WebAssembly.

Example 5. The system of Example 4, wherein the component model is a WebAssembly component model (WASM).

Example 6. The system of any of Examples 1-5, wherein the host programming language is Core Query Notation.

Example 7. The system of any of Examples 1-6, wherein the framework compiles the compiled component model into an interface compatible with the host programming language.

Example 8. A method comprising:
accessing a data model;
compiling the data model into a component model;
compiling the component model into a user programming language, the user programming language being a programming language compilable into a bytecode format;
accessing custom code, written in the user programming language, the custom code including the compiled component model;
compiling the custom code into the bytecode format;
loading the compiled custom code into a framework running a host programming language; and
executing the compiled custom code to create a server process.

Example 9. The method of Example 8, wherein the server process further contains at least one interface, based on the component model, that translates input to the custom code from a first format into the host programming language, and at least one interface, based on the component model, that translates output from the custom code from the host programming language into the first format.

Example 10. The method of Example 9, wherein the first format is Hypertext Transfer Protocol (HTTP).

Example 11. The method of any of Examples 8-10, wherein the bytecode format is WebAssembly.

Example 12. The method of Example 11, wherein the component model is a WebAssembly component model (WASM).

Example 13. The method of any of Examples 8-12, wherein the host programming language is Core Query Notation.

Example 14. The method of any of Examples 8-13, wherein the framework compiles the compiled component model into an interface compatible with the host programming language.

Example 15. A non-transitory machine-readable medium storing instructions which, when executed by one or more processors, cause the one or more processors to perform operations comprising:
accessing a data model;
compiling the data model into a component model;
compiling the component model into a user programming language, the user programming language being a programming language compilable into a bytecode format;
accessing custom code, written in the user language, the custom code including the compiled component model;
compiling the custom code into the bytecode format;
loading the compiled custom code into a framework running a host programming language; and
executing the compiled custom code to create a server process.

Example 16. The non-transitory machine-readable medium of Example 15, wherein the server process further contains at least one interface, based on the component model, that translates input to the custom code from a first format into the host programming language, and at least one interface, based on the component model, that translates output from the custom code from the host programming language into the first format.

Example 17. The non-transitory machine-readable medium of Example 16, wherein the first format is Hypertext Transfer Protocol (HTTP).

Example 18. The non-transitory machine-readable medium of Examples 15-17, wherein the bytecode format is WebAssembly.

Example 19. The non-transitory machine-readable medium of Example 18, wherein the component model is a WebAssembly component model (WASM).

Example 20. The non-transitory machine-readable medium of any of Examples 15-19, wherein the host programming language is Core Query Notation.

Figure 4:
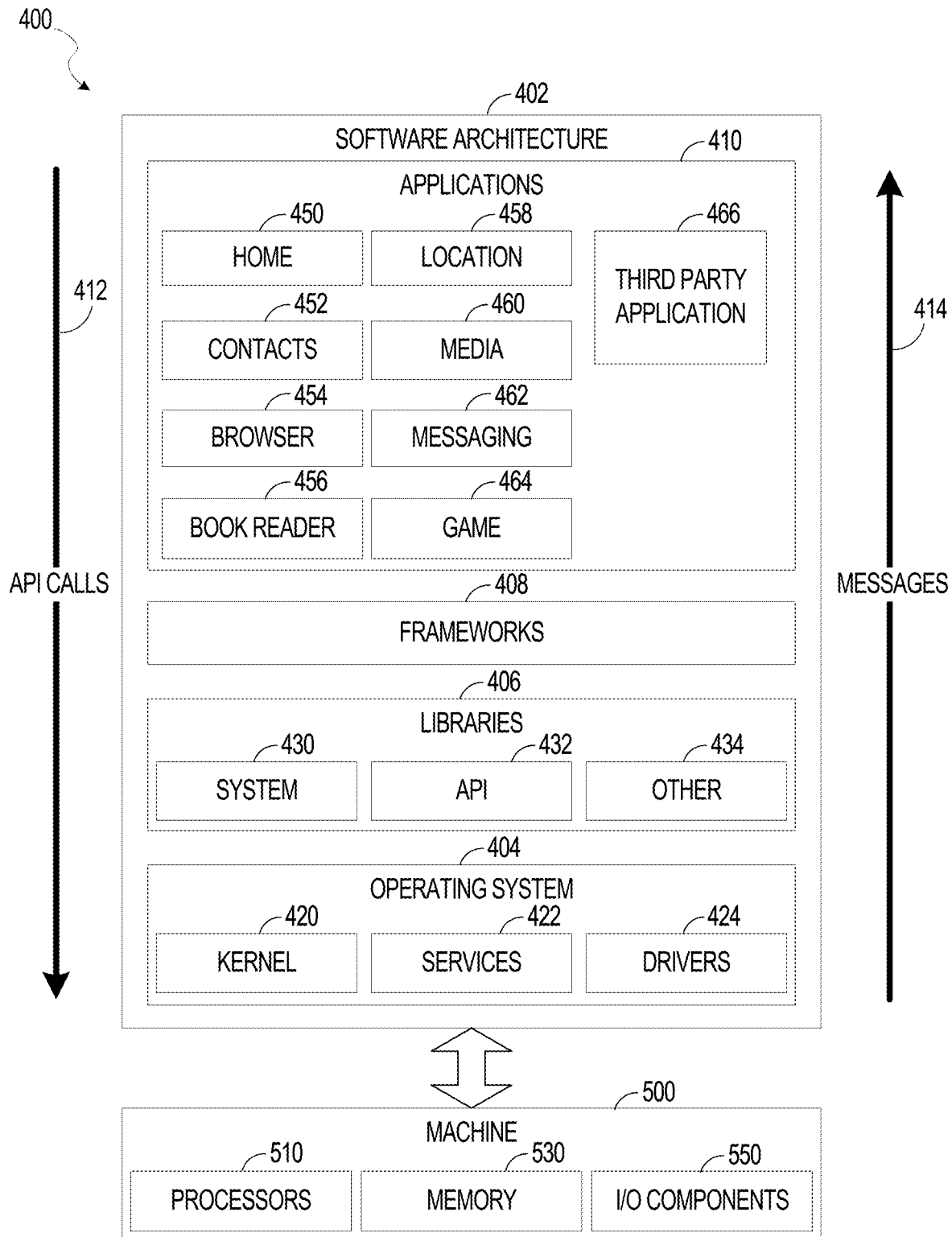
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
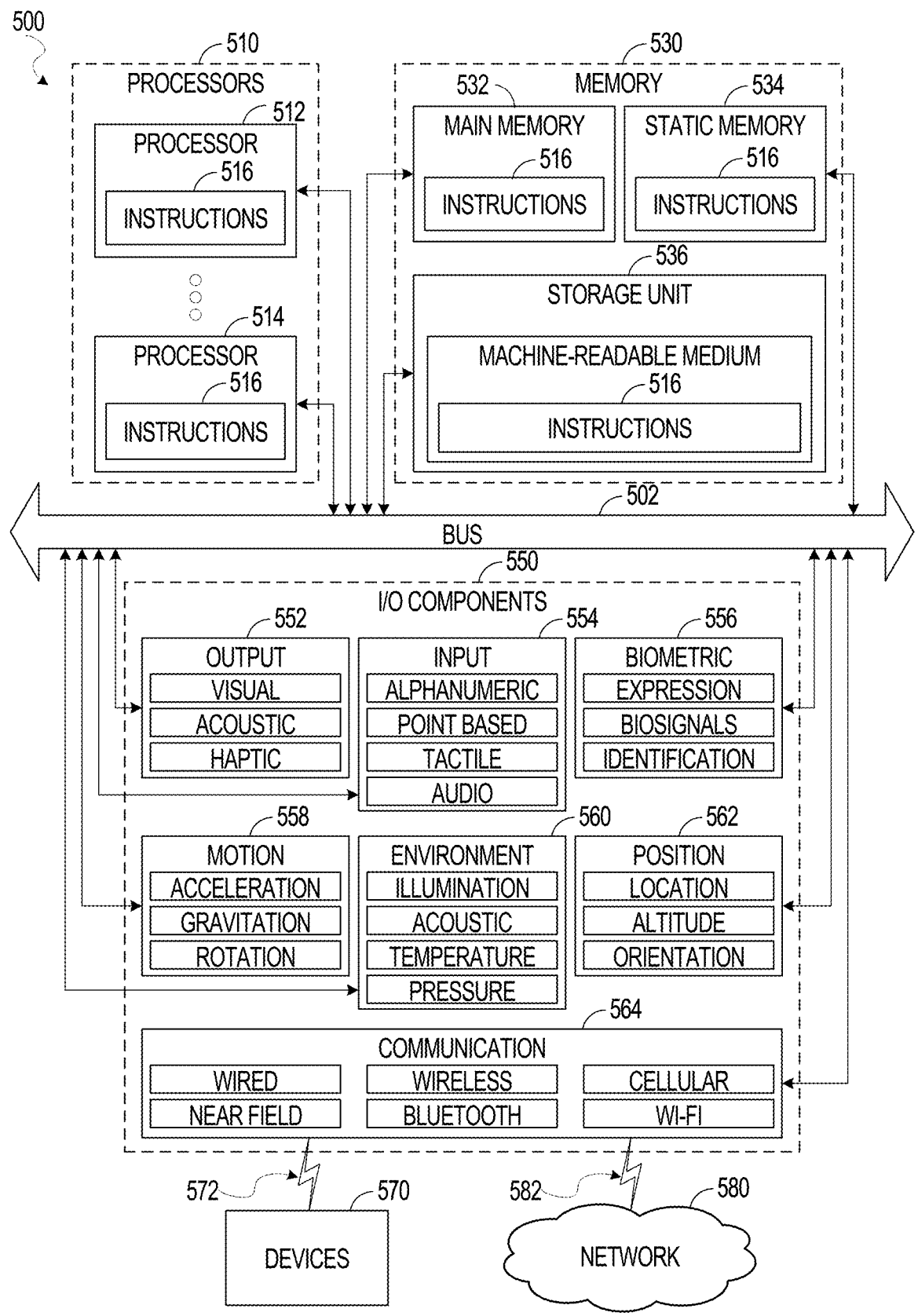
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the methods of FIGS. 2-3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol [HTTP]). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
    accessing a data model, the data model comprising a definition of entities and their relationships and definitions of services that operate on the entities;
    compiling the data model into a component model;
    compiling the component model into a user programming language, the user programming language being a programming language compilable into a bytecode format;
    accessing custom code, written in the user programming language, the custom code including the compiled component model;
    compiling the custom code into the bytecode format;
    loading the compiled custom code into a framework running a host programming language; and
    executing the compiled custom code to create a server process.

2. The system of claim 1, wherein the server process further contains at least one interface, based on the component model, that translates input to the custom code from a first format into the host programming language, and at least one interface, based on the component model, that translates output from the custom code from the host programming language into the first format.

3. The system of claim 2, wherein the first format is Hypertext Transfer Protocol (HTTP).

4. The system of claim 1, wherein the bytecode format is WebAssembly.

5. The system of claim 4, wherein the component model is a WebAssembly component model (WASM).

6. The system of claim 1, wherein the host programming language is Core Query Notation.

7. The system of claim 1, wherein the framework compiles the compiled component model into an interface compatible with the host programming language.

8. A method comprising:
    accessing a data model, the data model comprising a definition of entities and their relationships and definitions of services that operate on the entities;
    compiling the data model into a component model;
    compiling the component model into a user programming language, the user programming language being a programming language compilable into a bytecode format;
    accessing custom code, written in the user programming language, the custom code including the compiled component model;
    compiling the custom code into the bytecode format;
    loading the compiled custom code into a framework running a host programming language; and
    executing the compiled custom code to create a server process.

9. The method of claim 8, wherein the server process further contains at least one interface, based on the component model, that translates input to the custom code from a first format into the host programming language, and at least one interface, based on the component model, that translates output from the custom code from the host programming language into the first format.

10. The method of claim 9, wherein the first format is Hypertext Transfer Protocol (HTTP).

11. The method of claim 8, wherein the bytecode format is WebAssembly.

12. The method of claim 11, wherein the component model is a WebAssembly component model (WASM).

13. The method of claim 8, wherein the host programming language is Core Query Notation.

14. The method of claim 8, wherein the framework compiles the compiled component model into an interface compatible with the host programming language.

15. A non-transitory machine-readable medium storing instructions which, when executed by one or more processors, cause the one or more processors to perform operations comprising:
    accessing a data model, the data model comprising a definition of entities and their relationships and definitions of services that operate on the entities;
    compiling the data model into a component model;
    compiling the component model into a user programming language, the user programming language being a programming language compilable into a bytecode format;
    accessing custom code, written in the user language, the custom code including the compiled component model;
    compiling the custom code into the bytecode format;
    loading the compiled custom code into a framework running a host programming language; and
    executing the compiled custom code to create a server process.

16. The non-transitory machine-readable medium of claim 15, wherein the server process further contains at least one interface, based on the component model, that translates input to the custom code from a first format into the host programming language, and at least one interface, based on the component model, that translates output from the custom code from the host programming language into the first format.

17. The non-transitory machine-readable medium of claim 16, wherein the first format is Hypertext Transfer Protocol (HTTP).

18. The non-transitory machine-readable medium of claim 15, wherein the bytecode format is WebAssembly.

19. The non-transitory machine-readable medium of claim 18, wherein the component model is a WebAssembly component model (WASM).

20. The non-transitory machine-readable medium of claim 15, wherein the host programming language is Core Query Notation.

* * * * *